3,515,533
STABLE FERTILIZER AMMONIATING SOLUTION AND METHOD OF MAKING SAID SOLUTION
Robert John Church, Wilmington, Del., assignor to E. I. du Pont de Nemours and Company, Wilmington, Del., a corporation of Delaware
No Drawing. Filed May 17, 1967, Ser. No. 639,064
The portion of the term of the patent subsequent to Apr. 15, 1986, has been disclaimed
Int. Cl. C05c 9/00, 9/02
U.S. Cl. 71—30                                 4 Claims

ABSTRACT OF THE DISCLOSURE

Urea-formaldehyde containing solutions are commonly used in the preparation of mixed fertilizers. Urea-formaldehyde solutions such as those described in our co-pending application, S.N. 483,842, which has matured to Pat. No. 3,438,764, can be improved by admixture of 1–30% of ammonium nitrate with ammonia, urea, formaldehyde, water, and carbon dioxide if any is included, in preparing the ammoniating solution. The resulting solutions have a lower crystallization temperature, between —20 and —47° C. and improved stability.

BACKGROUND OF INVENTION

This invention relates to fertilizer ammoniating solutions which are useful in the preparation of mixed fertilizers. It is more particularly directed to aqueous ammonical solutions containing urea and formaldehyde in molar ratios greater than about 0.3:1 but less than 1:1, and to processes for preparing such solutions.

In the manufacture of certain mixed fertilizers, it is desirable that as much as possible of the total nitrogen content of the product be in a form which will supply nitrogen to the growing plant over a long period of time. Urea-formaldehyde polymers are a common, well-known and tested source of such nitrogen. An estimate of the amount of nitrogen in a urea-formaldehyde containing mixed fertilizer which will be available to growing plants over a long period of time can be obtained by a determination of the cold-water insoluble nitrogen content of the polymer. Cold water insoluble nitrogen, as used herein, is determined by the analysis procedure set out in paragraph 2.047 of "Official Methods of Analysis of the Association of Official Agricultural Chemists," ninth edition, 1960.

Cold water insoluble nitrogen in the form of urea-formaldehyde polymers is usually obtained in mixed fertilizers by adding to an acidic substrate, such as a superphosphate, a solution containing urea and a source of formaldehyde. When the solution contacts the acidic dry fertilizer ingredients, a condensation reaction is triggered to form the solid urea-formaldehyde polymer in situ in the mixture. This method has heretofore suffered from the disadvantage that it has not been possible to develop adequate amounts of urea-formaldehyde polymer on the substrate, the limiting factor being the tolerable concentration of formaldehyde in the ammoniating solution.

In the preparation of ammoniating solutions containing urea, ammonia, formaldehyde, and water it has been necessary that the concentration of formaldehyde be maintained below certain maximum level in order to avoid the formation at normal operating and storage of insoluble precipitates consisting either of crystalline hexamine (hexamethylenetetramine) or flocculent urea-formaldehyde polymers. Due to the insufficient amount of formaldehyde in the ammoniating solution, it had been possible to form cold water insoluble nitrogen of good quality in situ in the form of urea-formaldehyde polymer only to the extent of about 35% of the total nitrogen present.

The co-pending application of Robert J. Church, S.N. 483,842, which has matured to Pat. No. 3,438,764, discloses ammoniating solutions and the preparation thereof, making it possible to prepare mixed fertilizers containing as much as 50% or more of the total nitrogen as cold water insoluble urea-formaldehyde polymer of good agronomic value. Good agronomic value means that the Activity Index of the polymer is 40 or greater as described by the procedure given in paragraph 2.053 of the Association of Official Agricultural Chemists, "Official Methods of Analysis," ninth edition, page 15.

The fertilizer ammoniating solutions disclosed in the co-pending Church application have nominal compositions within the following range:

|  | Percent |
|---|---|
| Urea | 17–41 |
| Formaldehyde | 16–36 |
| Ammonia | 12–26 |
| Water | 14–29 |
| Carbon dioxide | 0–7 |

The percentages listed are percentages by weight based on the total weight of the solutions. In addition, the urea to formaldehyde ratios in the solutions are greater than about 0.3:1 but less than about 1:1. The crystallization temperature of the above urea-formaldehyde solutions is between +4 and —20° C.

One of the great difficulties involved in the manufacture and handling of these urea-formaldehyde fertilizer ammoniating solutions is the close controls which must be maintained during the process of preparation, storage and handling in order to insure that the components do not tend to precipitate or crystallize out prematurely. It is of major importance that the solutions retain their integrity and that all of the components be in solution, and not have settled out at the time of application. As will be seen hereinafter and in the co-pending Church application, the process of preparation of these fertilizer ammoniating solutions must be closely monitored and close control of process variables must be maintained.

SUMMARY OF INVENTION

It has now been found that the crystallization temperature of the urea-formaldehyde solutions as described above can be substantially lowered by addition to the solutions of from 1 to 30% by weight of ammonium nitrate. Addition of ammonium nitrate improves the solution characteristics and permits greater latitude in process control. The crystallization temperature of the solution is reduced and the stability of the resulting solutions increased.

The mole ratio of urea to formaldehyde in these urea-formaldehyde solutions will be greater than about 0.3:1 but less than 1:1. This means that when urea is present in the solutions in the amount of about 41% by weight, prior to addition of ammonium nitrate, the minimum amount of formaldehyde will be about 20.5% so as to provide a mole ratio less than 1:1. A ratio of urea to formaldehyde of 0.47 to 1 is commonly employed.

These solutions are prepared by mixing the ingredients in the proper proportions under conditions such that the temperature will reach a range of about 65 to 150° C. The mixture is maintained at this temperature during solution.

As is more fully described in our co-pending application, S.N. 483,842, now Pat. No. 3,438,764, mentioned above, the urea-formaldehyde solutions may be prepared for example by addition of an aqueous ammoniacal solution of urea to a solution containing urea, formaldehyde and water in the proper proportions to provide solutions having nominal compositions within the ranges specified. Upon this addition, an almost instantaneous exothermic reaction occurs between the ammonia and the formaldehyde to provide hexamine and causing the temperature of the mixture to rise to 95 to 125° C. When this method is followed, the order of mixing is important in forming the urea-formaldehyde-water solution. Reversal of this order may cause the formation of insoluble urea-formaldehyde condensation products which cannot be eliminated by heating.

In the alternative, solutions may be prepared by mixing the preformed reaction product of formaldehyde and ammonia, hexamine, with urea and water and, if desired, excess ammonia. In this method, the order of adding materials is not critical, the heat necessary being applied by external means. The methods of preparation are set out in some detail in the aforesaid Pat No. 3,438,764. Some examples will be given below.

Once the desired nominal urea-formaldehyde solution has been formed, the ammonium nitrate can be added. This addition will be accomplished either by direct addition of the solid in particulate form, or by addition of a concentrated aqueous solution.

In either case, stirring is required to disperse the ammonium nitrate and produce a uniform solution. When crystalline ammonium nitrate is added to the urea-formaldehyde solution, the temperature of the resulting solution will decrease because ammonium nitrate has a negative heat of solution. This phenomenon does not occur when a concentrated ammonium nitrate solution is used. However, concentrated ammonium nitrate solutions must be kept hot in order to keep the ammonium nitrate in solution. For example, 85.2 grams of ammonium nitrate can be dissolved in 14.8 grams of water but only at a minimum temperature of 80° C. The temperature of the resulting solution will be in between the temperature of the hot, concentrated ammonium nitrate solution, and the temperature of the urea-formaldehyde solution.

In general, 1% up to 30% by weight of ammonium nitrate will be added to a urea-formaldehyde solution of the nominal compositions described above and will result in a solution which has a lower crystallization temperature, better stability and a higher nitrogen content. If a greater amount of ammonium nitrate is incorporated in the solution, it has a negative effect on the crystallization temperature and solution stability. The addition of 20 to 30% ammonium nitrate to the urea-formaldehyde solutions described above will have the effect of lowering the crystallization temperature to the range of between —20 to —47° C., and this range is preferred. The addition of ammonium nitrate to urea-formaldehyde solutions reduces the pH of the solution slightly. The effect of addition of different amounts of ammonium nitrate on these variables is shown in Table I. The urea-formaldehyde solution employed had the following nominal composition:

| | Percent |
|---|---|
| Urea | 33.0 |
| Formaldehyde | 35.0 |
| Ammonia | 14.7 |
| Water | 17.3 |

It will be understood that "nominal compositions" are used throughout this specification and claims to indicate that the species listed may be present as such in the products or they may be present in whole or in part in chemical combination with other species. For example, ammonia will be present at least in part in combination with formaldehyde as hexamine. Formaldehyde will combine in part with ammonia to produce hexamine and also with urea to provide low molecular weight methylolureas. Water is produced with hexamethylenetetramine is formed from ammonia and formaldehyde, and will augment the amount of water present at the start of the reaction. The carbon dioxide, if present, will of course be combined with ammonia as ammonium carbamate. Thus, it is quite difficult to accurately define the composition of any given solution at any point in time and "nominal compositions" provide the necessary description.

TABLE I

| | | | | | | | | |
|---|---|---|---|---|---|---|---|---|
| Ammonium nitrate, wt. percent | 0 | 2.5 | 5.0 | 10.0 | 20.0 | 30.0 | 40.0 | 50.0 |
| Urea-formaldehyde solution, wt. percent | 100 | 97.5 | 95.0 | 90.0 | 80.0 | 70.0 | 60.0 | 50.0 |
| Crystallization temp., ° C | —15 | —18 | —19 | —22 | —47 | —47 | +2 | +21 |
| Total nitrogen, wt. percent | 27.5 | 27.7 | 27.9 | 28.3 | 29.0 | 29.8 | 30.5 | 31.3 |
| pH | 11.6 | 10.9 | 10.7 | 10.5 | 10.1 | 9.6 | 9.3 | 9.2 |

The crystallization temperature is obtained by completely freezing (usually below —50° C.) a sample and allowing it to warm slowly. The crystallization temperature is the temperature at which the last crystal goes into solution. However, solutions with a low crystallization temperature (i.e. —47° C.) do not form crystals as such, but go from a cloudy, white precipitate to a clear solution. Consequently, urea-formaldehyde solutions containing 20 to 30% (weight) ammonium nitrate behave like eutectic mixtures.

The stability of solutions of ammonium nitrate dissolved in urea-formaldehyde solutions can be determined by observing solutions that are stored at either room temperature or at reduced temperatures. A solution that has poor stability will produce a heavy white precipitate on standing, whereas a solution with good stability will remain clear. The stability of a urea-formaldehyde solution containing 20% ammonium nitrate was checked at both room temperature and at 0–5° C. At room temperature the mixed solution remains clear for longer than 8 months, while the urea-formaldehyde solution from which it was made developed a precipitate in 2 to 4 months. Similarly, after 50 days at 0–5° C., the mixed solution had a trace of precipitate, while the urea-formaldehyde solution from which it was made was ⅓ full of precipitate.

The urea-formaldehyde ammonium nitrate solutions of this invention have the following ranges of nominal compositions.

| | Percent by weight |
|---|---|
| $NH_3$ | 10–20 |
| Urea | 20–40 |
| $CH_2O$ | 20–50 |
| Water | 10–20 |
| $NH_4NO_3$ | 1–30 |
| $CO_2$ | 0–7 |

They will have a maximum crystallization temperature ranging from —15 to —47° C., and preferably —40 to —47° C.

Preferred compositions containing 20 to 30% ammonium nitrate in admixture with 70 to 80% of a urea-formaldehyde solution of the following nominal composition:

| | Percent |
|---|---|
| $NH_3$ | 14.5–15.5 |
| Urea | 32.5–34.5 |
| $CH_2O$ | 34.0–36.0 |
| $H_2O$ | 16.0–18.0 |

In this product, the urea:formaldehyde mole ratio would be near 0.49:1.

An especially preferred composition contains ingredients in the following percentages by weight:

| | Percent |
|---|---|
| $NH_3$ | 11.7 |
| Urea | 26.7 |
| $CH_2O$ | 28.2 |
| $H_2O$ | 13.4 |
| $NH_4NO_3$ | 20.0 |

Here the urea:formaldehyde mole ratio is 0.47:1.

The following examples are given by way of illustration of the invention.

Example I

A urea-formaldehyde fertilizing solution is prepared in a continuous manner by reacting 12.3 parts per minute of a solution containing 25% urea, 60% formaldehyde, and 15% water, with 3.56 parts per minute of a solution containing 45.4% urea, 35.5% ammonia and 19.1% water. The residence time is 6 minutes and a reaction temperature of 90 to 102° C. is developed. The reaction product is cooled to about room temperature and has the following nominal analysis: 33.4% urea, 35.2% formaldehyde, 14.7% ammonia, and 16.7% water. The crystallization temperature of the mixture is −15.5° C. and it has a total nitrogen content of 27.7%. This reaction product is a clear solution and has a composition that is typical of commercial fertilizer solutions that are used for producing mixed fertilizers which contain cold water insoluble nitrogen of good agronomic quality.

Example II

Ten parts of crystalline ammonium nitrate are dissolved in 40 parts of the urea-formaldehyde fertilizing solution prepared in Example I. The operation is carried out at room temperature and temperature of the mixture drops about 8° C. when the ammonium nitrate dissolves. The crystallization temperature of the mixture is determined to be −47° C. When the solution is stored at room temperature, it remains free of precipitate for one year. By contrast, the urea-formaldehyde fertilizing solution prepared in Example I develops a precipitate in about 2 months, and after one year's storage at room temperature has a very heavy precipitate. The composition and characteristics of these solutions are shown below:

| Product of | Example I | Example II |
|---|---|---|
| Ammonium nitrate, weight percent | 0 | 20.0 |
| Urea, weight percent | 33.4 | 26.7 |
| Formaldehyde, weight percent | 35.2 | 23.2 |
| Ammonia, weight percent | 14.7 | 11.7 |
| Water, weight percent | 16.7 | 13.4 |
| Crystallization temperature, °C | −15.5 | −47 |
| Room temperature stability | 2 months | Over 1 year |

Example III

Fifteen parts of crystalline ammonium nitrate are dissolved in 35 parts of the urea-formaldehyde fertilizing solution prepared in Example I. The operation is carried out at room temperature and the temperature of the mixture drops about 10 degrees when the ammonium nitrate dissolves. The crystallization temperature of the mixture is determined to be −47° C. When the solution is stored at room temperature, it remains free of precipitates for over one year. By contrast, the urea-formaldehyde solution prepared in Example I develops a precipitate in about 2 months, and after one year's storage at room temperature has a heavy precipitate. The compositions and characteristics of these solutions are summarized below:

| Product of | Example I | Example III |
|---|---|---|
| Ammonium nitrate, weight percent | 0 | 30.0 |
| Urea, weight percent | 33.4 | 23.4 |
| Formaldehyde, weight percent | 35.2 | 24.6 |
| Ammonia, weight percent | 14.7 | 10.3 |
| Water, weight percent | 16.7 | 11.7 |
| Crystallization temperature, °C | −15.5 | −47 |
| Room temperature stability | 2 months | Over 1 year |

Example IV

A urea-formaldehyde fertilizing solution is prepared in a continuous manner by reacting 12.5 parts per minute of a solution containing 23.4% urea, 59.5% formaldehyde and 17.1% water, with 8.83 parts per minute of a solution containing 45.4% urea, 35.5% ammonia, and 19.1% water. The residence time in the reactor is 5.9 minutes and a reaction temperature of 86 to 107° C. is developed. The reaction product is cooled to about room temperature and has the following analysis: 32.5% urea, 34.8% formaldehyde, 14.7% ammonia, and 18.0% water. The crystallization temperature of the mixture is −15° C. and it has a total nitrogen content of 27.3%. The reaction product is clear.

Examples V through VIII

A series of samples are prepared for low (0–5° C.) temperature stability tests by adding ammonium nitrate to the urea-formaldehyde fertilizing solution prepared in Example II. Solutions containing 2.5%, 5.0%, 10.0%, and 19.7% ammonium nitrate are prepared by adding 2, 4, 8 and 15.7 parts of ammonium nitrate to 78, 76, 72 and 64 parts of urea-formaldehyde fertilizing solution, respectively. These samples, along with a sample of the urea-formaldehyde solution, are placed in a refrigerator and stored at 0 to 5° C. for 50 days. The ammonium nitrate delays or prevents the start of precipitation, and this effect becomes more noticeable as the ammonium nitrate concentration is increased. The compositions and stability ratings of these samples is shown below:

| Ammonium nitrate weight percent | 0 | 2.5 | 5.0 | 10.0 | 20.0 |
|---|---|---|---|---|---|
| Urea weight percent | 32.5 | 31.7 | 30.9 | 29.3 | 26.0 |
| Formaldehyde weight percent | 34.8 | 33.9 | 33.1 | 31.3 | 27.8 |
| Ammonia weight percent | 14.7 | 14.3 | 13.9 | 13.2 | 11.8 |
| Water weight percent | 18.0 | 17.6 | 17.1 | 10.2 | 14.4 |
| Crystallization temperature, °C | −15 | −18 | −19 | −22 | −47 |
| Volume of precipitate after 50 days at 0 to 5° C. (as percent of total volume) | 33 | 20 | 16.7 | 13 | Trace |

What is claimed is:

1. In the preparation of a stable fertilizer ammoniating solution having a mole ratio of urea to formaldehyde of less than 1:1 but greater than about 0.3:1 and being made by mixing a nominal composition of

| | Percent |
|---|---|
| Ammonia | 12–26 |
| Formaldehyde (by weight) | 16–36 |
| Urea (by weight) | 17–41 |
| Water (by weight) | 14–29 |
| Carbon dioxide | 1–7 | and maintaining the mixture at a temperature of 65 to 150° C. for a period of time to produce the stable solution,
the improvement comprising admixing with said solution 1% to 30% by weight of ammonium nitrate, in order to lower crystallization temperature and increase stability.

2. In the preparation of a stable fertilizer ammoniating solution having a mole ratio of urea to formaldehyde of about 0.47 to 1, and being made by mixing a nominal composition of

| | Percent by weight |
|---|---|
| Urea | 33.4 |
| Formaldehyde | 35.2 |
| Ammonia | 14.5 |
| Water | 16.7 | maintaining the mixture at a temperature of 65 to 150° C. for a period of time to form the stable solution,
the improvement comprising admixing with said solution 20 to 30% by weight of ammonium nitrate, to reduce said crystallization temperature to between −40 to −47° C.

3. A stable fertilizer ammoniating solution having a mole ratio of urea to formaldehyde of less than 1:1 but greater than about 0.3:1, and having a nominal composition of

| | Percent |
|---|---|
| Ammonia (by weight) | 10–20 |
| Formaldehyde (by weight) | 20–50 |
| Urea (by weight) | 20–40 |
| Water (by weight) | 10–20 |
| Carbon dioxide | 0–7 |
| Ammonium nitrate | 1–30 |

4. A stable fertilizer ammoniating solution having a mole ratio of urea to formaldehyde of about 0.47 to 1 and having a nominal composition of

| | Percent |
|---|---|
| Urea (by weight) | 26.7 |
| Formaldehyde (by weight) | 28.2 |
| Ammonia (by weight) | 11.7 |
| Water (by weight) | 13.4 |
| Ammonium nitrate | 20 | having a crystallization temperature of from −40 to −47° C.

References Cited

UNITED STATES PATENTS

| 2,255,027 | 9/1941 | Keenen et al. | 71—30 |
| 3,092,486 | 6/1963 | Waters et al. | 71—28 X |

REUBEN FRIEDMAN, Primary Examiner

B. H. LEVENSON, Assistant Examiner

PO-1050
(5/69)

UNITED STATES PATENT OFFICE
CERTIFICATE OF CORRECTION

Patent No. 3,515,533      Dated June 2, 1970

Inventor(s) Robert J. Church

It is certified that error appears in the above-identified patent and that said Letters Patent are hereby corrected as shown below:

The concentration of carbon dixoide in Claim 1 should be changed from "1-7" to -- 0-7 --; and the concentration of ammonia in Claim 2 should be changed from "14.5" to -- 14.7 --.

SIGNED AND
SEALED
OCT 6 - 1970

(SEAL)
Attest:

Edward M. Fletcher, Jr.
Attesting Officer

WILLIAM E. SCHUYLER, JR.
                                Commissioner of Patents